United States Patent Office 2,980,739
Patented Apr. 18, 1961

2,980,739

PREPARATION OF FLUOROCARBONS

Mark Wendell Farlow, Wilmington, Del., assignor to E. I. du Pont de Nemours and Company, Wilmington, Del., a corporation of Delaware No Drawing. Filed Oct. 6, 1958, Ser. No. 765,331

20 Claims. (Cl. 260—653.3)

This invention relates to a new process of synthesizing compounds of carbon and fluorine (fluorocarbons) and compounds of carbon, fluorine and nitrogen. In particular, it relates to a new process of synthesizing tetrafluoroethylene and cyanogen fluoride.

The technical importance of fluorocarbons is constantly increasing. Tetrafluoroethylene in particular is of such high industrial interest that new and improved methods of synthesizing it are actively being sought. As to cyanogen fluoride, FCN, it is a little known, virtually unstudied compound which has heretofore been very difficult to synthesize. It is a gas (B.P. —44° C.) which can be used as a fumigant and disinfectant on account of its toxicity. Its trimer, cyanuric fluoride (FCN)$_3$, is more reactive than the well-known cyanuric chloride and is therefore highly suitable for the preparation of valuable cyanuric esters.

A recent technical advance in the field of carbonfluorine compounds is the discovery that fluorocarbons can be prepared by reacting certain organic or inorganic fluorides with elemental carbon at high temperature, e.g., in a carbon arc, and that tetrafluoroethylene is present in very substantial amounts in the fluorocarbon product when the reaction temperature is high enough (generally above 1500° C.) and the gaseous reaction product is rapidly cooled, preferably to below 500° C., immediately following contact with the hot carbon. These developments have been published in a series of United States patents, principally 2,709,182, issued to M. W. Farlow on May 24, 1955; 2,709,186 to 2,709,191 inclusive, issued to M. W. Farlow et al. on May 24, 1955; 2,709,192, issued to M. W. Farlow on May 24, 1955; 2,725,410, issued to M. W. Farlow et al. on November 29, 1955, and 2,732,-410-11, issued to M. W. Farlow et al. on January 24, 1956.

These high temperature processes constitute a major improvement in the field of fluorocarbon synthesis. However, they are not free of technical difficulties, especially with respect to continuous operation. When elemental carbon is consumed in a continuous process, it must be replaced continuously. This requirement is difficult to meet, particularly when the source of heat is a carbon arc, a preferred embodiment of these processes because of the very high temperatures which are readily attainable by means of an arc. With a carbon arc, some or all of the necessary carbon is supplied by the electrodes themselves, and consumption of carbon from the electrodes presents difficult engineering problems which interfere with continuous operation on a large scale. Even when the operation is carried out in an externally heated reactor, such as a tube of refractory material heated in a suitable furnace, the use of elemental carbon is not entirely satisfactory since the carbon must be continuously replaced in this type of apparatus. Moreover, contact between the gaseous or vaporized fluoride and the solid carbon may not be adequate, and the operator has little or no control over the proportion of carbon relative to the fluoride at any given moment, and thus is not able to create the most favorable conditions for the formation of the desired products.

There was therefore a need for an improvement in the high temperature synthesis of fluorocarbons, especially tetrafluoroethylene, and other fluorine-containing carbon compounds from carbon and fluorides, whereby the necessary carbon would not be present in elemental form, but would be supplied instead by an added volatile reactant capable of making intimate contact with the gaseous fluoride in any desired relative proportions.

This invention is a process of preparing fluorine-containing carbon compounds which comprises heating to a temperature of at least 1500° C. a mixture of (a) a fluoride of a non-metallic element of groups IV, V, VI and VII of the periodic table having an atomic number from 6 to 53, inclusive, and (b) a compound of the class consisting of carbon-nitrogen compounds and carbon-nitrogen-hydrogen compounds, said compound boiling below 300° C. at atmospheric pressure and cooling the gaseous reaction product within not more than one second to a temperature below 500° C.

This reaction yields a mixture of carbon-fluorine compounds, the major components of which are fluorocarbons, especially tetrafluoroethylene and carbon tetrafluoride, with lesser amounts of hexafluoroethane and still lesser amounts of other saturated or unsaturated fluorocarbons. Carbon - fluorine - nitrogen compounds, principally cyanogen fluoride and cyanuric fluoride, are generally present in minor amounts, although under certain conditions, for example, when the carbon-nitrogen reactant is used in high ratios relative to the fluoride reactant, cyanogen fluoride can form a substantial proportion of the reaction product. The crude reaction product may also contain some unreacted fluoride, which can be recycled, and the free element whose fluoride was employed, or compounds thereof.

In this reaction, most or all of the combined hydrogen that may be present in the system is converted to hydrogen fluoride, thus consuming part of the available fluorine. This side reaction is unavoidable when the carbon-supplying compound contains hydrogen, but it should be minimized to the extent possible. For this reason, as well as for reasons of better operability, the fluoride employed should contain no hydrogen. For the same reason, the carbon-supplying reactant should contain a minimum amount of hydrogen and the reactants should be anhydrous or substantially so.

It should be mentioned in this connection that the hydrogen fluoride which may be formed does not necessarily represent a loss of fluorine. If the fluorocarbons are the chiefly desired reaction products, that is, if the loss of cyanogen fluoride and other hydrolyzable products is not objectionable, the hydrogen fluoride can be recovered as sodium fluoride by scrubbing the gaseous reaction product with aqueous sodium hydroxide or sodium carbonate. This treatment does not affect the fluorocarbons, which are resistant to hydrolysis. The sodium fluoride so obtained can be converted to carbon tetrafluoride in excellent yields by reacting it with carbon and chlorine at a temperature in the range of 1200–1700° C., and the carbon tetrafluoride can be recycled to give tetrafluoroethylene by the process of this invention, or by reaction with hot elemental carbon as disclosed in the aforementioned U.S. Patent 2,709,192.

Another method of recovering the hydrogen fluoride, which does not involve hydrolysis of the water-sensitive reaction products, consists in bring the gaseous products in contact with an alkali metal fluoride, particularly sodium fluoride, which absorbs the hydrogen fluoride through formation of a non-volatile alkali metal bifluoride.

The fluorides suitable for use in this process are the hydrogen-free fluorides of those non-metallic elements in groups IV to VII of the periodic table which have atomic numbers from 6 to 53, inclusive. These non-metallic elements are found in subgroup A of groups IV to VII of the periodic table. Reference is made here to Deming's periodic table, as given in Deming's "General Chemistry" (John Wiley & Sons, Inc., 5th ed., pp. 11–13), and in many other reference books such as the Handbook of Chemistry and Physics, published by the Chemical Rubber Publishing Co. This table shows that the non-metallic elements are, besides the rare gases, the elements of group VII-A (i.e., the halogens); those in group VI-A having atomic numbers 8 to 52; those in group V-A having atomic numbers 7 to 33; those in group IV-A having atomic numbers 6 to 14; and boron in group III-A. Of these non-metallic elements, those in groups IV to VII which have atomic numbers 6 to 53 (i.e., carbon, silicon, nitrogen, phosphorus, arsenic, oxygen, sulfur, selenium, tellurium, fluorine, chlorine, bromine and iodine) are the elements whose fluorides are operable in this process. Thus, for example, the suitable fluorides including the carbon fluorides (fluorocarbons) free from aliphatic unsaturation, particularly $CF_4$ and $C_2F_6$; the silicon fluorides, particularly $SiF_4$; nitrogen trifluoride, phosphorus pentafluoride, arsenic trifluoride, and sulfur fluorides ($SF_4$ and $SF_6$), fluorine itself, chlorine trifluoride, iodine pentafluoride, etc. Fluorides in which more than one of the above-listed elements are combined with the fluorine, such as carbonyl fluorine, sulfuryl fluoride and thionyl fluoride, are also suitable.

For reasons of accessibility, ease of handling and good results, the preferred starting materials are elemental fluorine and the binary fluorides of the non-metallic elements in groups IV-A, V-A and VI-A of the periodic table. The most useful and preferred fluorides are the aliphatic, saturated fluorocarbons of one to two carbon atoms (carbon tetrafluoride and hexafluoroethane), silicon tetrafluoride, phosphorus pentafluoride, arsenic trifluoride, sulfur tetrafluoride and sulfur hexafluoride.

The carbon-supplying reactant can be any volatile (boiling below about 300° C. at atmospheric pressure, i.e., 760 mm. of mercury) compound of carbon and nitrogen, or of carbon, nitrogen and hydrogen. It is desirable that the atomic ratios of carbon to hydrogen and nitrogen to hydrogen in the hydrogen-containing carbon-supplying reactants be as high as possible, both in order to favor a higher rate of formation of carbon-fluorine and carbon-fluorine-nitrogen compounds per unit volume, and to minimize the formation of hydrogen fluoride. Thus, while reactants in which the C/H ratio is as low as 0.166:1 (e.g., methylhydrazine) and the N/H ratio is as low as 0.037:1 (e.g., tributylamine) are operable, it is preferred to use reactants in which the C/H ratio is at least 0.25:1 and the N/H ratio at least 0.1:1.

Among the suitable volatile carbon-supplying reactants may be mentioned cyanogen, hydrogen cyanide, diazomethane, methylhydrazine, phenylhydrazine; amines such as methylamine, ethylamine, n-propylamine, isobutylamine, n-hexylamine, n-octylamine, dimethylamine, diethylamine, trimethylamine, triethylamine, tri-n-butylamine, ethylenediamine, tetramethylenediamine, aniline, N-methylaniline, benzylamine, etc.; nitriles such as acetonitrile, propionitrile, butyronitrile, malononitrile, acrylonitrile, fumaronitrile, benzonitrile, benzyl cyanide, etc., heterocyclic compounds such as ethylenamine, N-methylethylenimine pyrrol, pyridine, ethylpyridine, piperidine, piperazine, pyrimidine, etc.; and the like. Both because they have lower boiling points and because they have higher C/H ratios, the preferred carbon-supplying reactants are those having from 1 to 4 carbon atoms.

The relative proportions of fluoride and carbon-supplying reactant are not critical. They are important only to the extent that maximum utilization of the fluoride and at the same time minimum formation of hydrogen fluoride are desired. In practice, the relative amounts of fluoride and carbon-supplying reactant are chosen so that the ratio of total combined carbon to total fluorine in the reacting system is at least 0.1:1, preferably at least 0.25:1. At the same time, in order to minimize the formation of hydrogen fluoride, it is desirable that the ratio of the total fluorine to the total combined hydrogen in the reacting system to be at least 1.5:1, preferably at least 3:1.

The reaction conditions are essentially those described in the patents already referred to for the synthesis of tetrafluoroethylene. Thus the reaction temperature should be at least 1500° C., and it can be as high as can be obtained by practical means, for example in the temperature range of the electric arc, which is estimated to be 2500–4000° C. or even higher.

The absolute pressure of the reactant gases during the pyrolysis is not critical. In general, however, it is much preferred to operate at reduced pressures, which can be as low as 1 mm. of mercury, but are desirably in the range of 10–300 mm. of mercury. This is especially desirable when an electric arc is used as the source of heat, since the operation of the arc becomes much more difficult with increase in pressure. With other types of reactors, e.g., with externally heated tubular reactors, the absolute pressure is also much preferably subatmospheric (e.g., in the range of 10–300 mm.), but it can be atmospheric or even superatmospheric.

Practical conversions to the chiefly desired products, i.e., tetrafluoroethylene and cyanogen fluoride, can be obtained only if the product emerging from the hot reaction zone is cooled very rapidly (quenched) to a temperature not exceeding 500° C., preferably of the order of 400° C. or lower. The time required to cool the gaseous reaction product, that is, the time of transition from the reaction temperature to a temperature of about 400–500° C., should not exceed one second. Preferably, it is in the range of 0.001 to 0.1 second. The optimum rate of flow through the hot reaction zone of the gaseous reactants depends in large part on this quenching requirement, that is, on the efficiency of the quenching system. Reduced pressures facilitate rapid quenching in any given form of apparatus.

The necessary quenching can be achieved in various ways. For example, the off-gas upon leaving the hot reaction zone can be made to pass over the outside wall of a metal vessel containing a coolant material such as water, solid carbon dioxide or liquid nitrogen and located a short distance from the reaction zone, or the off-gas can be passed through a double-walled hollow cylinder with or without radial fins, cooled with circulating water. In another modification, the off-gas is carried immediately from the hot zone into a suitably designed quench reactor where it comes in intimate contact with a finely divided (fluidized) solid, which is advantageously carbon.

Apparatus of any suitable design can be used to carry out the process of this invention. For example, the reactor can be a tube of refractory material, if desired packed with particles of an appropriate infusible substance to improve contact between the reactants, through which is passed a mixture in the desired proportions of the gaseous or vaporized fluoride and carbon-supplying reactant. The tube is heated to at least 1500° C. in a resistance furnace or induction furnace, and appropriate means are provided to quench the off-gas and collect the reaction products. In this type of equipment, however, in view of the corrosive nature of many fluorides and reaction by-products at the high temperatures involved, it is often desirable to use carbon or graphite as the material of construction for the hot parts of the reactor and as the contact masses. Some of this carbon participates in the reaction, in spite of the fact that most of the carbon will be furnished by the added volatile carbon compound. Thus, while the use of a carbon-supplying reactant is advantageous even in an apparatus made of, or containing carbon, the full advantages of the process are not realized in such a case.

A preferred device for carrying out the process is the electric arc, which produces extremely high temperatures. In this type of apparatus, the electrodes can be made of a heat- and corrosion-resistant metal, such as copper or tungsten, thereby contributing no carbon to the reaction. In addition, metal electrodes can be kept relatively cool through internal circulation of a cooling liquid, and under such conditions they remain substantially unattacked for considerable periods of time. Carbon electrodes are also entirely suitable, and a carbon arc can be used even without special provisions for preventing or decreasing electrode consumption, since even in such a case a very substantial amount of the necessary carbon is supplied by the added volatile carbon compound rather than by the electrodes. However, here again the full advantages of the process are realized only when essentially non-consumable carbon electrodes are used. A carbon anode can be made essentially non-consumable by maintaining it at a relatively low temperature, in practice below about 1500° C. This can be accomplished by using a relatively thin anode supported by, and in intimate contact with, a water-cooled metallic holder, this device providing very efficient external cooling of the carbon anode. In a low tension arc the cathode cannot be similarly cooled since its temperature must be high enough to sustain thermal emission of electrodes, but the cathode normally furnishes little or no carbon. With a cool anode, a carbon electrode system loses substantially no carbon, as can be demonstrated by weighing the electrodes before and after operating the arc.

Improved forms of carbon arc for the synthesis of fluorocarbons are described in the aforementioned U.S. Patent 2,709,192 and in other patents. These are suitable for use in the present process, with such appropriate modifications as may be required for the cooling of the electrodes, if this is desired, and for the introduction of the carbon-supplying reactant. The latter is preferably introduced in the gaseous or vaporized form, if desired premixed with the gaseous or vaporized fluoride in the desired proportions, but it can also be delivered as a liquid or even as a solid into the reaction, where it vaporizes before entering the arc zone. A substantially inert carrier gas such as nitrogen or helium can be used if desired.

An especially suitable type of electric arc for use in this process is a magnetically rotated electric arc. In comparison with static arcs of conventional design or even with the improved arcs of the kind mentioned above, a rotating arc is far more efficient by virtue of its much greater stability and of the far better contact between arc and reactants that it permits. The examples which follow were carried out using an arc of this type.

A particularly efficient type of rotating carbon arc operates as follows: the reactants (fluorine and carbon-supplying compound) pass through a symmetrical annular gap formed by a substantially cylindrical solid graphite cathode and a substantially cylindrical hollow graphite anode, wherein a continuous electrical discharge is rotated by magnetic lines of flux essentially parallel to the axis of rotation of the annular arc. This causes the arc to move at right angle to the magnetic field lines. The magnetic field is created by surrounding the arc chamber with a coil through which a current (preferably a direct current) passes. A field strength suitable to cause rotation is 100–200 gausses. The arc rotates extremely rapidly in the annular gap between the electrodes, its speed being estimated at 1000–10,000 revolutions per second, and it heats the reactants very uniformly to extremely high temperatures as they pass through the gap. The gaseous reaction product leaves the arc chamber through the hollow anode and is immediately cooled by contact with cold portions of the apparatus or with a specially designed quenching unit.

The electrical characteristics of the rotating arc are essentially similar to those of the static arc. Thus, operating conditions of the arc may be varied over a wide range from the minimum voltage required to maintain the arc to very high voltages, e.g., in the range of 10–75 volts. In general, for a given current the required voltage of the arc is determined by the pressure in the system, the width of the arc gap, and the nature of the gases present in the arc chamber. The power requirements will, of course, depend on the quantity of reactants passed through the rotating arc and the temperature to which they are to be heated.

The arc may be operated with a direct current or with an alternating current if the alternating current is of high frequency and is employed in combination with an alternating magnetic field which is in phase with the arc current. A direct current is greatly preferred, since only with a direct current is it possible to obtain a truly continuous rotating arc resulting in uniform heating and high stability. Current intensities in the range of 20–500 amperes are generally used.

As already mentioned, some hydrogen fluoride is formed when the carbon-supplying reactant contains hydrogen. The crude reaction product can be given a preliminary treatment to remove the hydrogen fluoride, for example by bringing it in contact with sodium fluoride. With or without prior removal of the hydrogen fluoride, the various ingredients (tetrafluoroethylene, other fluorocarbons, cyanogen fluoride, cyanuric fluoride, etc.) can be isolated by passing the gaseous reaction product through cold condensers and fractionating the condensate through efficient distilling columns.

The following examples illustrate the invention in greater detail.

Example I

A gaseous mixture of carbon tetrafluoride and cyanogen in the molar ratio $CF_4:(CN)_2$ of 2:1 was passed through a magnetically rotated carbon arc at an absolute pressure within the arc chamber of 20 mm. of mercury. The cathode was a graphite rod, $3/16''$ in diameter, and the anode was a hollow graphite cylinder having an internal diameter of $0.5''$, mounted on a water-cooled ring-shaped copper holder which served to keep the anode cool. The arc was operated at 30 volts and 40–50 amperes. The reactant gases after passing through the arc flame in the annular space between the electrodes, left the hot reaction zone through the hollow anode and encountered a water-cooled copper surface about one inch downstream from the arc zone, where the gaseous reaction product was quenched to below 500° C. within a few microseconds following contact with the arc flame.

The condensable product, formed at the rate of about 29 g. per hour, was collected in a copper trap which was cooled externally by means of liquid nitrogen. Analysis of the product by mass spectroscopy indicated that it consisted chiefly of fluorocarbons in the following molar proportions: tetrafluoroethylene, 64%; carbon tetrafluoride, 22%; higher fluorocarbons, 6%. In addition, the product contained cyanogen fluoride, cyanuric fluoride, trifluoroacetonitrile and cyanogen, with some (uncondensed) nitrogen.

Example II

Using the apparatus and procedure of Example I, a mixture of carbon tetrafluoride and hydrogen cyanide in the molar ratio $CF_4:HCN$ of 1.8:1 was passed through the arc and the product was collected at the rate of about 32 g. per hour. The reaction product contained small amounts of hydrogen fluoride, nitrogen and nitrogen compounds, but the major products were fluorocarbons in the following molar proportions: tetrafluoroethylene, 52%; carbon tetrafluoride, 35%; higher fluorocarbons, 13%.

Example III

The apparatus used was essentially that of Example I, except that the quenching surface was cooled with liquid nitrogen, the pressure within the arc chamber was 88 mm. of mercury and the arc was operated at 54 volts and 40 amperes. The reactants were carbon tetrafluoride and cyanogen but the latter was used in higher proportions than in Example I, the molar ratio $CF_4:(CN)_2$ being 1:1.25. Nitrogen was used as a carrier gas, the rate of flow per minute being 575 ml. of nitrogen, 100 ml. of carbon tetrafluoride and 125 ml. of cyanogen, all at standard temperature and pressure.

Under these conditions, carbon-fluorine-nitrogen products were formed in substantial amounts. The product, exclusive of nitrogen, contained, on a molar basis, 49% of tetrafluoroethylene, 23% of cyanogen fluoride, 5% of hexafluoroethane, 6% of carbon tetrafluoride, 8% of cyanogen and 5% of trifluoroacetonitrile. The electrodes were found to have lost no weight, indicating that all of the necessary carbon was derived from the cyanogen.

Example IV

The apparatus was essentially similar to that of Example III. The arc was operated at 34 volts and 35 amperes, and the pressure within the arc chamber was 80–84 mm. of mercury. The reactants were phosphorus pentafluoride and cyanogen in 1:1 molar ratio, and nitrogen was used as a carrier gas, these ingredients being passed through the arc at a flow rate per minute of 120 ml. of nitrogen, 100 ml. of $PF_5$ and 100 ml. of $(CN)_2$ at standard temperature and pressure.

In this reaction, phosphorus trifluoride is a major product since two of the fluorine atoms in phosphorus pentafluoride are much more reactive than the other three. The reaction product, exclusive of nitrogen, was found to contain, on a molar basis, 65% of phosphorus trifluoride, 6.4% of cyanogen, 1.6% of carbon tetrafluoride, 4.7% of tetrafluoroethylene, 0.7% of other fluorocarbons and 0.2% of cyanogen fluoride. There were also present some silicon tetrafluoride and some chlorofluorocarbons, derived from hydrogen chloride impurities in the phosphorus pentafluoride. The graphite electrodes showed no loss in weight.

Similar results were obtained when the graphite electrodes were replaced by a copper anode and a tungsten cathode.

Example V

The apparatus used was essentially that of Example III except that provision was included to inject cyanogen directly into the arc flame from water-cooled orifices to minimize predecomposition. The arc was operated at 44 volts and 41 amperes, and the pressure within the arc chamber was 62–70 mm. of mercury. The reactants were sulfur tetrafluoride and cyanogen in approximately 1:1.6 molar ratio with excess nitrogen used as a carrier gas and to reduce contact time with the arc. The reactants were passed through the arc at a flow rate, per minute, of 75 ml. of sulfur tetrafluoride, 120 ml. of cyanogen, and 425 ml. of nitrogen at standard temperature and pressure.

The product, exclusive of nitrogen, contained on a molar basis, 19% of tetrafluoroethylene and 20% of cyanogen fluoride, along with 16% of carbon disulfide, 6% of carbon tetrafluoride, 25% of cyanogen, 6% of trifluoroacetonitrile, and other products in minor amounts. The graphite electrodes suffered only slight attrition, indicating that most of the carbon in the products was derived from the cyanogen.

It is to be understood that the foregoing examples are merely illustrative of the invention described and are not intended to limit the invention. In essentially the same way and giving rise to the same fluorocarbon reaction products, there may be used hexafluoroethane, silicon tetrafluoride, arsenic trifluoride, sulfur hexafluoride, fluorine, chlorine trifluoride, or nitrogen trifluoride as the fluoride component and diazomethane, methylhydrazine, n-propylamine, aniline, acrylonitrile, propionitrile or benzonitrile as the carbon-supplying component of the reaction mixture.

I claim:

1. A process for the preparation of fluorine-containing carbon compounds which comprises heating to a temperature of at least 1500° C. a mixture of (a) a fluoride of a non-metallic element of groups IV to VII of the periodic table, having an atomic number from 6 to 53 inclusive, and (b) a compound of the class consisting of carbon-nitrogen compounds and carbon-nitrogen-hydrogen compounds, said compound boiling below 300° C. at atmospheric pressure, said carbon and nitrogen, or carbon, nitrogen and hydrogen, being the only elements in said compounds, and cooling the gaseous reaction product to a temperature below 500° C. in less than one second.

2. A process for the preparation of fluorine-containing carbon compounds which comprises heating to a temperature of at least 1500° C. a mixture of (a) a fluoride of a non-metallic element of group IV of the periodic table having an atomic number of 6 to 14 inclusive, and (b) a compound of the class consisting of carbon-nitrogen compounds and carbon-nitrogen-hydrogen compounds boiling below 300° C. at atmospheric pressure, said carbon and nitrogen, or carbon, nitrogen and hydrogen, being the only elements in said compounds, and cooling the gaseous reaction product to a temperature below 500° C. in less than one second.

3. The process as set forth in claim 2 wherein the non-metallic element is carbon.

4. The process as set forth in claim 3 wherein the fluoride of carbon is carbon tetrafluoride.

5. The process as set forth in claim 3 wherein the fluoride of carbon is hexafluoroethane.

6. The process as set forth in claim 2 wherein the non-metallic element is silicon.

7. A process for the preparation of fluorine-containing carbon compounds which comprises heating to a temperature of at least 1500° C. a mixture of (a) a fluoride of a non-metallic element of group V of the periodic table having an atomic number of 7 to 33 inclusive and (b) a compound of the class consisting of carbon-nitrogen compounds and carbon-nitrogen-hydrogen compounds, boiling below 300° C at atmospheric pressure, said carbon and nitrogen, or carbon, nitrogen and hydrogen, being the only elements in said compounds, and cooling the gaseous reaction products to a temperature below 500° C. in less than one second.

8. The process as set forth in claim 7 wherein the non-metallic element in nitrogen.

9. The process as set forth in claim 7 wherein the non-metallic element is arsenic.

10. The process as set forth in claim 7 wherein the non-metallic element is phosphorus.

11. The process as set forth in claim 10 wherein the fluoride of phosphorus is phosphorus pentafluoride.

12. A process for the preparation of fluorine-containing carbon compounds which comprises heating to a temperature of at least 1500° C. a mixture of (a) a fluoride of a non-metallic element of group VI of the periodic table having an atomic number of 8 to 52 inclusive, and (b) a compound of the class consisting of carbon-nitrogen compounds and carbon-nitrogen-hydrogen compounds boiling below 300° C. at atmospheric pressure, said carbon and nitrogen, or carbon, nitrogen and hydrogen, being the only elements in said compounds, and cooling the gaseous reaction products to a temperature below 500° C. in less than one second.

13. The process as set forth in claim 12 wherein the non-metallic element is sulfur.

14. The process as set forth in claim 13 wherein the fluoride of sulfur is sulfur tetrafluoride.

15. The process for the preparation of fluorine-containing carbon compounds which comprises heating to a temperature of at least 1500° C. a mixture of (a) a fluoride of a non-metallic element of group VII of the periodic table having an atomic number of 9 to 53 inclusive, and (b) a compound of the class consisting of carbon-nitrogen compounds and carbon-nitrogen-hydrogen compounds boiling below 300° C. at atmospheric pressure, said carbon and nitrogen, or carbon, nitrogen and hydrogen, being the only elements in said compounds, and cooling the gaseous reaction product to a temperature below 500° C. in less than one second.

16. The process as set forth in claim 15 wherein the fluoride of the non-metallic element is fluorine.

17. A process for the preparation of tetrafluoroethylene which comprises passing through an electric carbon arc a mixture of (a) a fluoride of a non-metallic element of group IV to VII of the periodic table having an atomic number of 6 to 53 inclusive, and (b) a compound consisting of carbon and nitrogen and having from 1 to 4 carbon atoms and cooling the gaseous reaction products to below 500° C. in less than one second.

18. The process as set forth in claim 17 wherein the carbon-nitrogen compound is cyanogen.

19. A process for the preparation of tetrafluoroethylene which comprises passing through an electric carbon arc a mixture of (a) a fluoride of a non-metallic element of groups IV to VII of the periodic table having an atomic number of 6 to 53 inclusive, and (b) a compound consisting of carbon nitrogen and hydrogen and having from 1 to 4 carbon atoms and cooling the gaseous reaction products to below 500° C. in less than one second.

20. The process as set forth in claim 19 wherein the carbon-nitrogen-hydrogen compound is hydrogen cyanide.

References Cited in the file of this patent
UNITED STATES PATENTS

| | | |
|---|---|---|
| 2,709,186 | Farlow et al. | May 24, 1955 |
| 2,732,410 | Farlow et al. | Jan. 24, 1956 |
| 2,732,411 | Farlow et al. | Jan. 24, 1956 |
| 2,773,089 | Anderson | Dec. 4, 1956 |
| 2,859,245 | Smith | Nov. 4, 1958 |

UNITED STATES PATENT OFFICE
CERTIFICATION OF CORRECTION

Patent No. 2,980,739 April 18, 1961

Mark Wendell Farlow

It is hereby certified that error appears in the above numbered patent requiring correction and that the said Letters Patent should read as corrected below.

Column 1, line 67, after "must" insert -- also --; column 2, line 67, for "bring" read -- bringing --; column 4, line 7, strike out "to"; column 5, line 28, for "electrodes" read -- electrons --; line 43, for "reaction" read -- reactor --.

Signed and sealed this 5th day of September 1961.

(SEAL)
Attest:

ERNEST W. SWIDER
Attesting Officer

DAVID L. LADD
Commissioner of Patents